Patented Jan. 11, 1927.

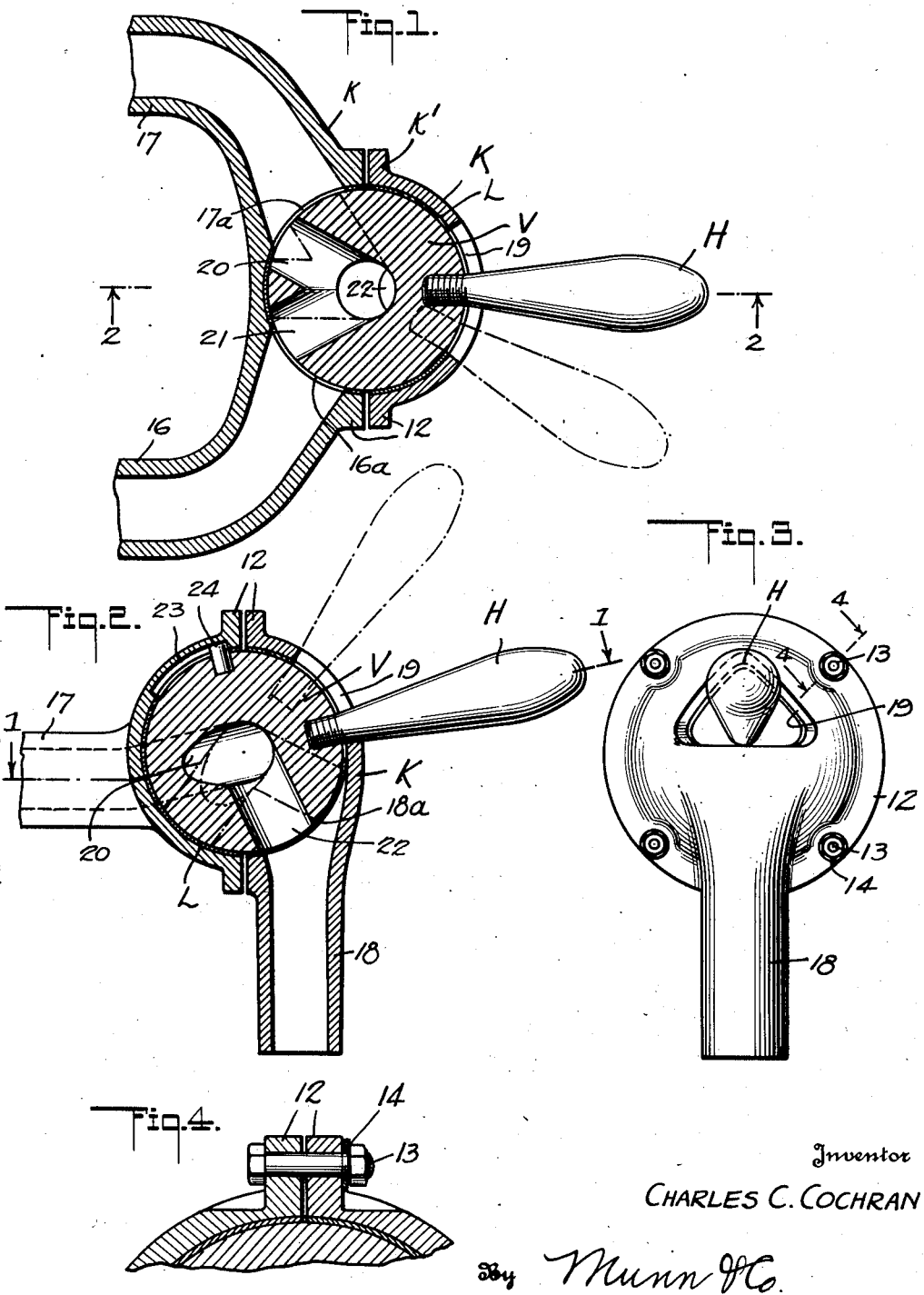

1,614,437

UNITED STATES PATENT OFFICE.

CHARLES C. COCHRAN, OF LOS ANGELES, CALIFORNIA.

MIXING VALVE.

Application filed September 30, 1924. Serial No. 740,789.

My invention relates to mixing valves and a purpose of my invention is the provision of a valve capable of controlling the discharge of fluids from a plurality of sources of fluid supply through a common discharge and in such manner that a mixing of the several fluids is effected prior to or simultaneously with their discharge, my invention being particularly adapted, although not necessarily, for mixing hot and cold water in any proportions desired whereby the temperature of the water can be controlled and varied at will and all with the use of only a single valve.

It is also a purpose of my invention to provide a valve of the above described character which has the added advantage of being movable to effect discharge of only the cold water or the hot water, and in any quantity desired.

I will describe only one form of mixing valve embodying my invention, and will then point out the novel features thereof in claims.

In the accompanying drawings—

Figure 1 is a view showing in horizontal section one form of mixing valve embodied in my invention;

Figure 2 is a vertical sectional view taken on the line 2—2 of Figure 1;

Figure 3 is a view showing the valve in front elevation;

Figure 4 is a fragmentary sectional view taken on the line 4—4 of Figure 3.

Referring specifically to the drawings, in which similar reference characters refer to similar parts, my invention essentially consists of a casing K substantially of spherical form and a valve body V also of spherical form and movable in the casing by means of a handle H to cause passages therein to register with certain ports in the casing for controlling the passage of a plurality of fluids. The casing K in the present instance is shown as made of two sections $k$ and $k'$, the confronting edges of the sections being formed with flanges 12 through which extend bolts 13 carrying spring washers 14 for the purpose of yieldably holding the sections in casing formation. The section $k$ is provided with tubular extensions 16 and 17 which, in reality, constitute water pipes, and in actual practice the pipe 16 is connected to a source of hot water supply, while the pipe 17 is connected to a source of cold water supply. These pipes 16 and 17 merge into the spherical casing K and at their points of connection with the casing form inlet ports $16^a$ and $17^a$, respectively, through which the water finds access to the valve body V.

The section $k'$ is formed with a discharge nozzle 18 which merges into the spherical casing, as clearly shown in Figure 2, and which provides a discharge port $18^a$ at its point of connection with the casing. The section $k'$ is also formed with a triangular opening 19 through which a handle H extends and is movable to effect manipulation of the valve body V. It will be noted that the handle H has threaded detachable connection with the valve body.

The valve body V is formed with two inlet passages 20 and 21, one for each of the ports $16^a$ and $17^a$, and these passages converge into a discharge passage 22 disposed substantially at right angles to the inlet passages and adapted to have communication at all times with the discharge port $18^a$.

To provide a fluid-tight joint between the casing K and the valve body V and yet permit of the desired movement of the valve body within the casing, I provide a liner L preferably formed of Babbitt metal and applied in the molten state after the valve body has been placed within the casing. It will be understood that the liner L is such as not to obstruct the passage of fluid through the passages and ports, or the manipulation of the handle H within the opening 19.

In order to restrict the movement of the valve body V to within certain limits for the purpose of maintaining the passages of the valve body in proper operative relation to the inlet and discharge ports, I have provided a groove 23 upon the inner side of the casing K and a pin 24 fixed in the valve body V and movable in the groove 23.

In practice, the valve body normally occupies a position in which the passages 20 and 21 are out of registration with the ports $16^a$ and $17^a$, so as to prevent the discharge of water from the pipes 16 and 17 through the valve body and into the nozzle 18. In this closed position of the valve body the handle H occupies the position indicated in dash lines in Figure 2. Should it be desired to simultaneously open the ports $16^a$ and $17^a$ so as to discharge equal quantities of hot water and cold water, the handle H is moved downwardly in a vertical plane so as to rotate the valve body V about a horizontal axis. During this movement of the valve body the passages 20 and 21 are elevated so as to gradually bring their outer ends into registration with the ports 16ª and 17ª and thus effect a discharge of water from the pipes into the inlet passages and from the latter into the discharge passage 22, where a mixing of the two streams of water takes place. From the discharge passage, the mixed stream of water is discharged as a single stream from the nozzle 18, and it will be understood that the valve body can be held in any intermediate position between the completely closed position and the completely open position so that any quantity of water can be discharged through the valve. In the completely open position of the inlet passages the handle H is in the lowermost position shown in Figure 2, and which position is defined by the pin 24 reposing in the upper end of the grooves 23. Although the pin limits the rotational movement of the valve body about a horizontal axis, it will be clear that the valve body is free to rotate about a vertical axis and to thereby vary the horizontal position of the inlet passages 20 and 21. In this manner the quantity of water discharged from either pipe 16 or 17 can be varied at will. As the quantity of cold water, for example, discharged from the pipe 16 is decreased, the quantity of hot water discharged from the pipe 17 will be increased, thus increasing the temperature of the resultant mixture discharged from the nozzle 18. Conversely, as the quantity of hot water discharged is decreased the quantity of cold water discharged will be increased, thus increasing the temperature of the resultant mixture. This variance in temperature of the water can take place at any point within the adjustment of the valve body V so that it is unnecessary to return the valve body to closed position in order to effect this variance in temperature of the water.

Should it be desired to effect the discharge of the cold water or the hot water independently of each other and in any quantity desired, it is only necessary to move the handle H downwardly along either inclined edge of the triangular opening 19, such movement of the valve body being permitted by virtue of the pin 24. When moving the handle in this manner the valve body is shifted so that either inlet passage 20 or 21 moves vertically in a path out of registration with the corresponding port 16ª or 17ª, while the other inlet passage is gradually moved into complete registration with the port 16ª or 17ª. When manipulating the valve body in this manner the discharge port 22 is still in communication with the discharge nozzle 18 so that water discharged through either inlet passage is free to flow from the nozzle 18.

Although I have herein shown and described only one form of mixing valve embodying my invention, it is to be understood that various changes and modifications may be made herein without departing from the spirit of the invention and the spirit and scope of the appended claims.

I claim:

1. A valve structure comprising a sectional casing, a valve operating in the casing and provided with port ways opening to each other and extending in relatively different directions, one section of the casing having hot and cold water connections, respectively, co-acting with said portways, a liner between the sections having a portion adapted to respectively close and partly close either of said portways to the respective connections, the other section having a discharge nozzle communicating with said portways, and means to permit the valve to be moved with respect to the portways and with respect to the liner so that the portways will be respectively and in graduated degrees alined with said intake connections, and whereby when the valve is turned to one position the portways will be entirely closed by said liner.

2. A valve structure comprising a sectional casing, a valve operating in the casing and provided with portways opening to each other and extending in relatively different directions, one section of the casing having hot and cold water connections, respectively, co-acting with said portways, a liner between the sections having a portion adapted to respectively close and partly close either of said portways to the respective connections, the other section having a discharge nozzle communicating with said portways, means to permit the valve to be moved with respect to the portways and with respect to the liner so that the portways will be respectively and in graduated degrees alined with said intake connections, and whereby when the valve is turned to one position the portways will be entirely closed by said liner, and means to advance both sections of the casing against said liner.

CHARLES C. COCHRAN.